United States Patent [19]
Luckenbill

[11] 3,738,390
[45] June 12, 1973

[54] FIRE HYDRANT
[75] Inventor: Lawrence F. Luckenbill, Decatur, Ill.
[73] Assignee: Mueller Co., Decatur, Ill.
[22] Filed: Sept. 7, 1971
[21] Appl. No.: 178,242

[52] U.S. Cl. ................ 137/797, 94/1.5, 256/13.1, 285/2
[51] Int. Cl. .......................... E03b 9/12, F16d 9/00
[58] Field of Search ................ 137/68, 797; 52/98; 94/1.5; 285/2, 3, 4

[56] References Cited
UNITED STATES PATENTS

| | | | |
|---|---|---|---|
| 2,083,054 | 6/1937 | Cline | 285/2 |
| 2,138,159 | 11/1938 | Hanks | 285/2 X |
| 3,331,397 | 7/1967 | Mueller et al. | 137/797 |
| 3,439,938 | 4/1969 | Dunton | 137/68 X |

Primary Examiner—Henry T. Klinksiek
Assistant Examiner—Richard Gerard
Attorney—Cushman, Darby & Cushman

[57] ABSTRACT

A safety coupling for connecting two sections of a vertical standard-like member such as a fire hydrant, light pole, sign post, vertical post of a guard rail or similar accessories wherein the upper section is intended to move when subjected to a lateral shock from any angle without damage to the lower anchored or support section. The upper and lower sections are provided with peripheral flanges on their abutting ends and a plurality of frangible clips are angularly spaced about the standard-like member and engage the undersurface of both flanges, the clips being held in position against the flanges by bolts provided with weakening grooves which permit the bolts to bend or shear. The combined use of frangible clips and frangible bolts permits the upper section to be struck at different angles of impact such as in direct line with a bolt and clip arrangement or intermediate a pair of spaced bolt and clip arrangements and when so struck the upper section may be knocked over without damage to the lower section thereby permitting repair without replacement of the lower or anchored section.

18 Claims, 7 Drawing Figures

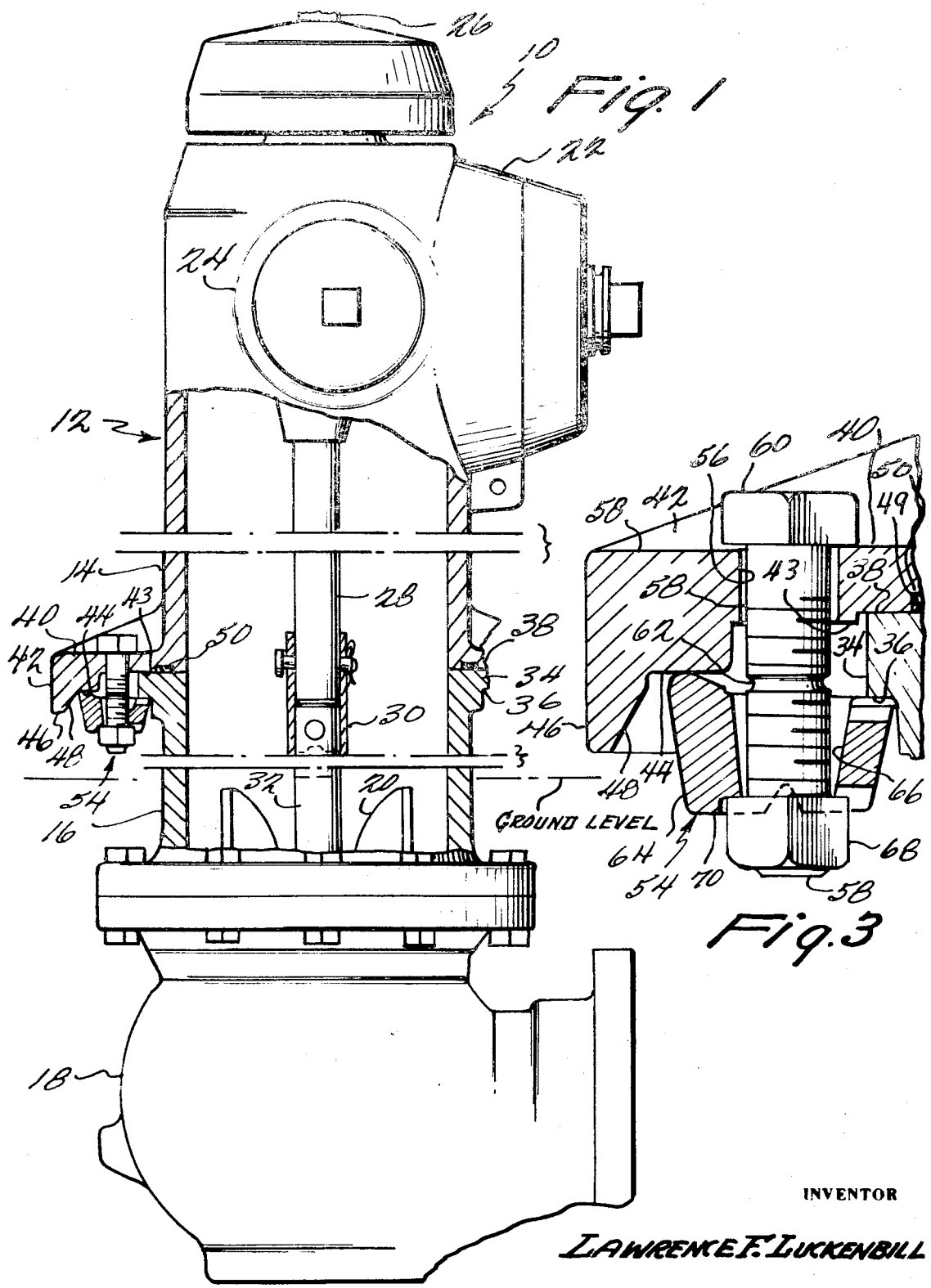

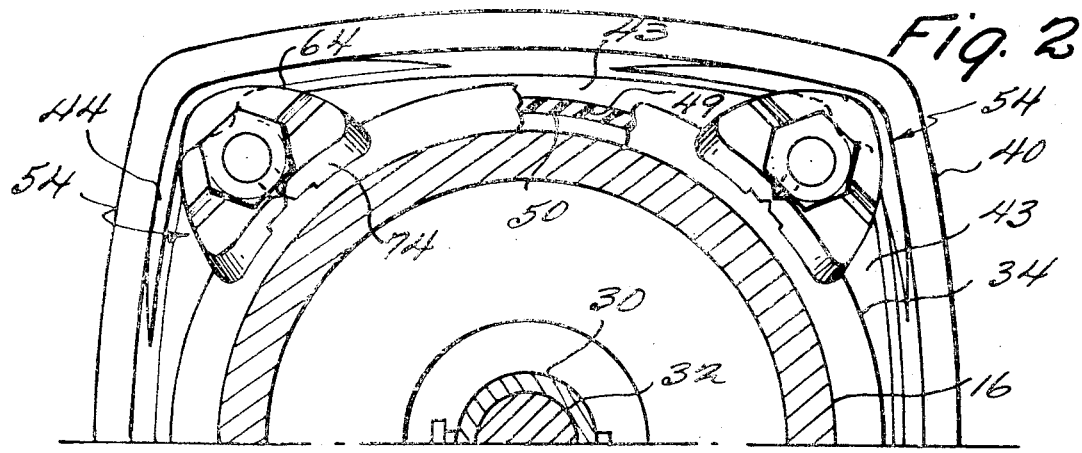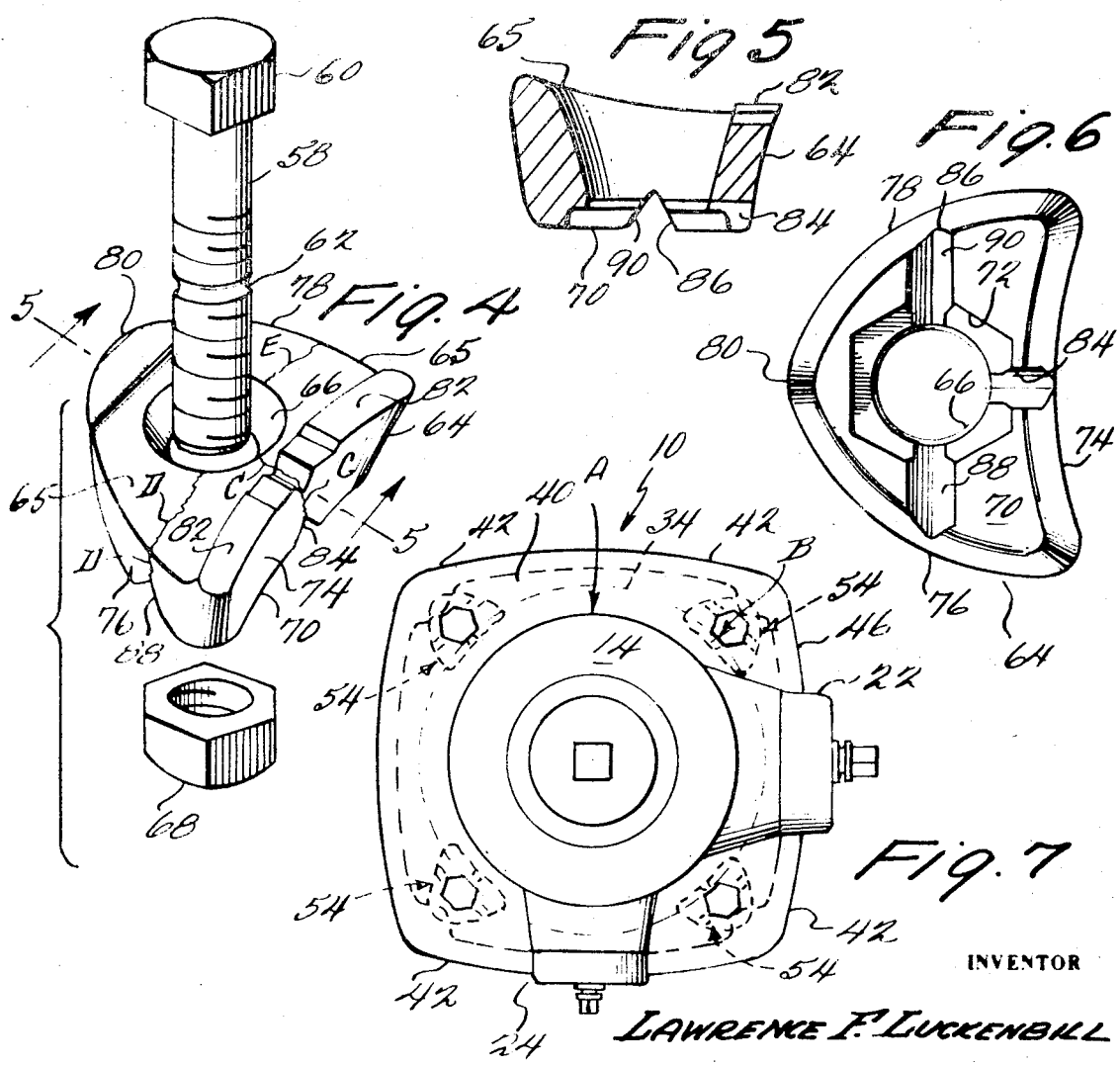

FIRE HYDRANT

The present invention relates to an improvement in safety couplings for connecting together the upper and lower sections of a vertical standard-like member such as a fire hydrant, light pole, sign post, vertical post of a guard rail, and the like. More particularly, the present invention provides an improved safety coupling which not only minimizes damage to the vehicle striking the same, but eliminates damage to the lower or anchored section of the vertical standard while also minimizing damage to the struck upper section of the vertical standard-like member.

BACKGROUND OF THE INVENTION

Efforts have been made and are being made constantly to improve safety couplings for connecting an upper section to a fixed lower support section of vertical-like standards. In this respect, there is a twofold purpose in providing safety couplings for vertical standard-like members positioned along highways, runways, and the like. First, where such vertical standards are likely to be struck by a vehicle, it is one purpose of such couplings to reduce as much as possible injury to the occupants of the vehicle and damage to the vehicle. A second purpose for such couplings is to reduce damage to the vertical standard-like member, especially the elimination of damage to the lower section which is usually anchored in the ground and the minimizing of damage to the upper section. By preventing damage to the lower section and minimizing damage to the upper section, repair or replacement of the upper section may be quickly and economically accomplished.

Such safety couplings have been widely used in the past in fire hydrants wherein the hydrant barrel is made of an upper section and a lower section which usually houses the valve. By making the upper section capable of being knocked over without damage to the valve structure in the lower section, the expense of repair is considerably reduced as well as the inconvenience to users of water in the immediate area as distribution does not have to be cut off during the repair. Because of the frequent accidents on highways and the like, use of these safety couplings have been extended to accessories along the highway in an effort to reduce casualties and damage to the striking vehicle.

In one form of known safety coupling, the abutting ends of the sections are provided with peripheral flanges, the flange of the upper section overlapping or being of a larger diameter than that of the lower section. The two sections were secured together by a coupling ring made up of two or more arcuate segments arranged to abut the lower surface of each of the flanges, the coupling ring being bolted to the upper flange and being provided with a circumferential weakening groove. In such an arrangement, unless the blow to the upper section developed component forces which immediately resulted in high upward shearing forces on the segments of the coupling ring to cause immediate shearing of the same, the lateral movement of the upper section would cause damage to the lower section necessitating its repair or replacement. To avoid this, the flanges for the upper section and lower section had to be specifically designed wherein a lateral blow on the upper section caused the upper section to immediately start to rise and thus immediately shear the coupling ring. However, the bolts would still oftentimes drag over the end of the lower section and cause damage. One such prior art arrangement of the type just described is disclosed in U.S. Pat. No. 3,331,397 issued July 18, 1967 to Frank H. Mueller and Oscar E. Brown.

In another form of known safety coupling wherein the upper and lower sections were provided with conventional abutting flanges, a plurality of closely spaced bolts extended through the flanges, each of the bolts being provided with a circumferential weakening groove which was positioned in a plane substantially between the abutting flanges. This arrangement proved quite satisfactory as long as the bolts were spaced quite close to one another, especially in arrangements for hydrants wherein the cumulative effect of the bolts had to be sufficient to withstand the hydrostatic loads which placed tension on the bolts. Where fewer bolts were used the diameter of the bolts had to necessarily be increased and consequently all of the bolts did not shear and they would cause damage when dragged over the lower flange. This was particularly true when the angle of impact was intermediate a pair of the second bolts. Prior art arrangements utilizing a frangible bolt concept are shown in U.S. Pat. No. 2,083,054 issued June 8, 1937 to Earl E. Cline and U.S. Pat. No. 2,576,631 issued Nov. 27, 1951 to Robert H. Mueller and Earl E. Cline.

BRIEF SUMMARY OF THE INVENTION

The present invention will be described in connection with a fire hydrant for which it is especially adapted. However, it will be appreciated by those skilled in the art that the invention may be utilized in providing a safety coupling for a standard-like member other than a fire hydrant.

The fire hydrant utilizing the present invention includes an upper hydrant barrel section having the usual outlet nozzle or nozzles thereon and a valve operating nut, and a lower hydrant barrel section provided with the usual hydrant shoe in which may be mounted the hydrant valve. A valve stem extending from the operating nut downwardly through the upper and lower hydrant barrel sections is operatively connected to the hydrant valve and this stem is sectional and includes an upper stem section and a lower stem section coupled together by a frangible coupling sleeve in the area of the connection between the upper hydrant barrel section and the lower hydrant barrel section.

The lower hydrant barrel section is provided at its upper end with an outwardly extending annular integral flange. The upper hydrant barrel section is provided at its lower end with an outwardly extending integral flange which overlaps the annular flange on the lower hydrant barrel section and which is preferably polygonal in plan elevation so that it is provided with a plurality of corner areas. Each corner area is provided with an aperture therethrough for receiving a bolt forming part of the safety coupling. Each bolt is provided with a weakening groove. A triangular shaped apertured frangible clip is received on the end of each of the bolts, the clip bearing on the underside of each of the flanges. Each clip is provided with weakening grooves on its undersurface and the clips are retained in position to clamp the hydrant barrel sections together by means of nuts.

The clips and bolts are angularly spaced about the hydrant at least 60° apart and consequently there may be six or less bolt and clip combinations, but no less than two, for retaining the upper barrel section on the lower barrel section. Preferably there are four bolt and clip combinations with the flange of the upper hydrant barrel section being generally square in plan elevation to provide four corner areas. Of course, the flange could be annular but this would result in using more material in the upper hydrant barrel section than necessary.

An annular groove is provided in the end or downwardly facing surface of the upper flange, the groove being rectangular in radial section. A ring gasket of complementary rectangular section but having a slightly less diameter than the diameter of the groove is stretched to fit into the groove and is thus properly retained in position when the upper barrel section is installed on the lower barrel section.

It has been found necessary in the safety coupling arrangement of the present invention to provide in combination the frangible bolt and the frangible clip in order to eliminate damage to the lower hydrant barrel section when the upper hydrant barrel section is subjected to a lateral shock from different angles. In this respect, a unique condition occurs when the upper barrel section is struck from different angles. For example, if the upper hydrant is impacted with a shock intermediate spaced bolts and clip combinations, the two bolts on either side of the line of impact shock and closest to the impact shock break or shear whereas those bolts furthest from the shock tend to bend with the clips breaking. On the other hand, if the line of the impact shock is directly in radial alignment with a corner having a bolt and clip, this one bolt will shear whereas the bolts spaced away from this particular corner will bend but their clips will break. This is caused because there is slippage first of the upper hydrant barrel section causing the bolt closest to impact to break, the slippage being followed by tipping of the upper barrel section so that the clips of the bolt and clip combinations on either side of the line of impact are twisted side to side thereby causing fracture of the same. Various intermediate angles of impact cause variations in the combinations of breakage of bolts and for clips where such breakage is necessary.

BRIEF DESCRIPTION OF THE DRAWINGS

FIG. 1 is a fragmentary elevational view, partly in vertical section, of a fire hydrant incorporating the safety coupling of the present invention;

FIG. 2 is a horizontal fragmentary sectional view of the hydrant of the present invention with parts being broken away and looking in a direction upwardly from beneath the flanges of the upper and lower hydrant barrel sections;

FIG. 3 is an enlarged fragmentary vertical sectional view of one bolt and clip arrangement of the safety coupling of the present invention;

FIG. 4 is an exploded perspective view of the bolt, clip and nut for the safety coupling of the present invention;

FIG. 5 is a sectional view of the clip taken on the line 5—5 of FIG. 4;

FIG. 6 is a bottom elevational view of the clip of FIG. 4; and

FIG. 7 is a schematic top elevational view of the hydrant of the present invention and illustrating the upper hydrant barrel section being struck from different angles.

DETAILED DESCRIPTION OF THE INVENTION

Referring now to the drawings wherein like reference numerals or characters represent like or similar parts, there is disclosed in FIG. 1 a fire hydrant 10 of the present invention having a plural section hydrant barrel generally designated at 12 and comprising an upper hydrant barrel section or part 14 and a lower hydrant barrel section or part 16. The lower hydrant barrel section 16 is provided with a hydrant shoe 18 which contains a hydrant valve, a portion of which is shown at 20. The lower hydrant barrel section 16 with the hydrant shoe 18 is buried almost entirely beneath the ground with only a small section of the upper end protruding above the ground level. Consequently, the lower hydrant barrel section 16 normally will not be struck by a vehicle.

The upper hydrant barrel section 14 has at least one outlet nozzle 22 thereon although there is usually a second nozzle outlet 24 and in some instances a third nozzle outlet (not shown). An operating nut or head 26 extends from the upper end of the upper hydrant barrel section 14 and is operatively connected to an upper valve stem section 28. The lower end of the upper valve stem section 28 is coupled by means of a frangible coupling sleeve 30 to the upper end of a lower valve stem section 32, the lower end of the lower valve stem section 32 being operatively connected to the hydrant valve 20. The frangible stem coupling sleeve 30 may be of the conventional type or of a type such as disclosed in U.S. Pat. No. 3,439,947 issued Apr. 22, 1969 to Lawrence F. Luckenbill and Joseph L. Daghe. It will be noted that the upper end of the valve stem section 32 is positioned below the upper end of the lower hydrant barrel section 16 and this is purposely done to prevent damage to the valve stem section 32 and the valve 20 when the upper hydrant barrel section 14 is knocked over by a vehicle and should the wheel of the vehicle pass directly over the lower hydrant barrel section 16.

The lower hydrant barrel section 16 is provided at its upper end with an integral annular flange 34 which has a downwardly facing surface 36 and an upwardly facing surface 38. The upper hydrant barrel section 14 at its lower end is provided with an integral flange 40 which is polygonal in plan elevation and, preferably, generally rectangular so as to have four corner areas 42. The flange 40 extends beyond or overlaps the flange 34 at least in the corner areas 42, the flange 40 being provided with a downwardly extending peripheral skirt 46. The skirt 46 is provided with an inwardly facing tapered wall 48 as added protection for the upper end of the lower hydrant barrel section when the upper hydrant barrel section 14 is knocked over. In other words, the tapered wall 48 will assist in causing the skirt to clear or slide over the edge of the flange 34 as the barrel section 14 is slipping and tipping over. The flange 40 of the upper hydrant barrel section 14 is provided with a downwardly facing surface 43 for abutting the upwardly facing surface 38 of flange 34. Downwardly facing surface 43 is stepped downwardly as indicated at 44 outwardly of the flange 34 and at least at the corner areas 42, the plane of the surface 44 being closely adjacent to the plane of the downwardly facing surface 36 of annular flange 34 when the upper hydrant barrel section 14 is in position on the lower hydrant barrel section 16.

As best shown in FIGS. 1 and 2, the downwardly facing surface 43 of the flange 40 is provided with an annular groove 49 co-axial of the upper hydrant barrel section 14 which is rectangular in radial section. A ring gasket 50 made of a suitable elastomeric material and also having a radial section, which is rectangular and complementary to the section of the groove 49, is received in the groove. The ring gasket 50 has a relaxed diameter slightly less than the diameter of the groove 49 so that it has to be extended or stretched to be inserted in the groove. This insures proper positioning of the gasket as it is inserted into the groove 49 prior to assembly of the upper hydrant barrel section 14 on the lower hydrant barrel section 16 and, thus, it is held in proper position and does not fall out during such installation. Additionally, by providing the groove 49 and gasket 50 on the flange 40 of the upper hydrant barrel section 14, the section 14 may be installed on any type of lower hydrant barrel section 16 when it is desired to replace the existing upper hydrant barrel section with one incorporating the present invention. In other words, some lower hydrant barrel sections already in existence merely have an annular flange at their upper ends with a planar upwardly facing surface and these could easily accommodate the upper hydrant barrel section 14 of the present invention whereas others might have an annular groove in such a flange which could be easily filled in the field with lead or some other filling material to present a surface for sealing with the gasket. By positioning the gasket 50 in the groove 49 of the upper hydrant barrel 14, and once the hydrant has been assembled, the upper hydrant barrel section 14 can be subsequently adjusted on its vertical axis to adjust the nozzles 22 and 24 to a desired position without lifting the hydrant barrel section 14 off of the lower hydrant barrel section 16. This may be accomplished because the gasket 50 is retained between the radially spaced walls of the groove 49.

Referring now to FIGS. 3 through 6 inclusive, the safety coupling generally designated at 54 is best shown and includes a plurality of angularly spaced bolt and clip arrangements, there being one such arrangement at each of the corner areas 42 of the flange 40. In more detail, the flange 40 in each corner area 42 is provided with an aperture 56 which receives a frangible bolt 58, the bolt having a head 60 bearing on the upwardly facing surface 58 of flange 40. A circumferential weakening groove 62 is provided on the shank of the bolt 58 and is generally in a position in the area of the planes of the downwardly facing surfaces 36 and 44 of flanges 34 and 40 respectively. A triangular shaped frangible clip 64 made of cast iron or other suitable material and having an aperture 66 therethrough fits onto the bolt 58 and its upper side 65 bears against the undersurface 36 and downwardly stepped portion 44 of the undersurface 43 of the flanges 34 and 40 respectively. The frangible clip 64 is retained in this position clamping the upper hydrant barrel section 14 to the lower hydrant barrel section 16 by means of a nut 68 threaded onto the end of the bolt 58 and bearing against the underside or downwardly facing side 70 of the clip 64.

The underside or downwardly facing side 70 of the clip 64 is provided with a polygonal shaped recess 72 which is complementary to the shape of the nut 68. Thus, when the bolts 58 and clips 64 are being assembled, the nut is held in place in the recess 72 and the bolt 58 is tightened by turning its head 60 with a ratchet wrench or the like. The bolts 58 are positioned with the bolt heads 60 on the top as opposed to having the nuts 68 on the top and this somewhat reduces the potential of corrosion thread problems and weakening of the bolt as the water can run off of the upper flange 40. Thus the nut 68 and the threads of the bolt 58 are shielded and not subjected to rain water. Additionally, providing the bolt head 60 on the top improves the overall appearance of the safety coupling arrangement 54 for the hydrant 10.

Referring now to FIGS. 4, 5 and 6, the triangular shaped frangible clip 64 is provided with a base edge 74 which lies closest to the axis of the hydrant 10 when the clip is in position. The other two triangular edges 76 and 78 terminate in an apex portion 80 and it will be noted that these edges are convexly curved (FIG. 6) whereas the base edge 74 is slightly concavely curved so as to fit snug with the wall of the lower hydrant barrel section 16. The upper side 65 in the area of the apex portion 80 outwardly of the aperture 66 provides a bearing surface for bearing against the step portion 44 of the undersurface 43 of flange 40. Along the base edge 74 of the clip on the upper surface 65, there is provided two bearing pads 82 for bearing against the undersurface 36 of the annular flange 34 on the lower hydrant barrel section 16. The underside 70 of the clip 65 is provided with a first weakening groove 84 which extends radially from the edge 74 and terminates at the aperture 66. The axis of this groove 84 lies in a radial plane extending through the hydrant axis when the clip 64 is in position. A second weakening groove 86 is provided on the side 70, the second weakening groove comprising two groove sections 88 and 90 respectively extending from the sides 76 and 78, each section 88 and 90 terminating at the aperture 66. The grooves 84 and 86 have axes intersecting the axis of the aperture 66 and, thus the bolt axis, with the groove 86 being transverse relative to the groove 84.

It will be noted by reference to FIG. 4 that the pads 82 are spaced relative to one another, the spacing being such that the bearing surfaces of the pads are outwardly of a plane extending through the first weakening groove 84. This was purposely done so that when the bolt and clamp arrangements 54 were in clamping position and the surfaces of the pads 82 were bearing against the downwardly facing surface 36 of flange 38 there would be a uniform loading on the clamp 64 away from the areas of the weakening groove 84. The bearing surface on the side 65 adjacent the apex portion 80 of clip 64 also is not effected by either of the weakening grooves 84 and 86 as the weakening groove 84 does not extend completely across the underside 70 of the clip. Such an arrangement provides the clips 64 with sufficient strength to resist breaking upon tightening of the bolts and to resist breaking under hydrostatic loads exerted thereon when the hydrant is in use. In other words, the stresses within the clip are uniformly distributed away from the weakening grooves 84 and 86, this being further enhanced by the grooves being located on the side of the same away from the bearing surfaces. However, the clip 64 can fracture when impact loads are exerted on the upper hydrant barrel section 14 and cause twisting loads on the clip. Coupled with the above, the bolts 58 are designed to assume the tension resulting from clamping loads and hydrostatic loads and yet they can still bend or shear because of the weakening groove 62. The positioning of the bolts with the heads up, as mentioned above, reduces the corrosion possibilities and thus the bolts will not be prematurely weakened in the area of the weakening groove which could possibly cause failure in tension.

Referring now to FIG. 7, the arrow A represents the upper hydrant barrel section 14 being impacted with a shock intermediate the spaced bolt and clip combinations 54. When the line of impact shock is such as indicated at A, the two bolts 54 closest to the impact will shear because of the initial sliding movement of the upper hydrant barrel section 14 relative to the lower hydrant barrel section 16. Tipping of the upper hydrant barrel section 14 then occurs and the bolts furthest from the shock or impact tend to bend with the respective clips 64 possibly breaking if sufficient twisting load is imposed. However, since these latter mentioned clips are on the far side of the hydrant 10 they could slip off of the flange 34 of the lower hydrant barrel section 16 before breaking and without damage to the same. The clips 64 closest to the impact would possibly break when the upper hydrant barrel section begins to tip if their respective bolts 58 had not completely sheared.

In a situation where the line of the impact shock is directly in radial alignment with a corner having a bolt and clip arrangement 54 such as indicated at B in FIG. 7, the bolts 58 at this corner will shear from the sidewise movement or slippage of the upper hydrant barrel section 14. However, the bolts 58 positioned 90° to the line of impact may possibly start to bend but once the tipping action starts for the upper hydrant barrel section 14, the clips 64 for the bolts 90° from the line of impact are twisted and thereby cause to fracture radially of the hydrant center line along the wavy line C of FIG. 4 and at least along one of the wavy lines D or E. It will be noted the clips 64 may break into two or three pieces.

Striking of a hydrant on lines of impact intermediate the lines A and B cause various conditions of breakage of either the bolts or the clips of a combination or both dependent on the local shearing action on the bolts and/or twisting action on the clips.

The important aspect of the overall design of providing the combination of frangible clips and frangible bolts is that the upper hydrant barrel section will always clear the lower hydrant barrel section on traffic breakover. If the arrangement was such that all bolts were designed to fail upon impact, the cumulative bolt strength would not be sufficient in tension to accommodate tension resulting from the clamping action and the hydrostatic loads. If the bolts were made strong enough to have sufficient tensile strength, then those bolts which did not receive a sufficient impact to shear the same would drag over the lower hydrant barrel section damaging its upper flange. Likewise, if the bolts were not frangible but the clips were made sufficiently frangible so that all clips would break on impact, then the clips would not be strong enough to assume the clamping loads and hydrostatic loads. If the clips were not strong enough to accommodate such loads, then the same problem would result in that certain clips would not break as the twisting loads on certain clips would not be sufficient and thus the clips and bolts would drag over the flange of the lower hydrant barrel section and damage the same.

The terminology used in this specification is for the purpose of description and not limitations, the scope of the invention being defined in the claims.

I claim:

1. A safety coupling for connecting two vertically positioned sections of a standard-like member, the upper of said sections being intended to move when subjected to a lateral shock from any angle without damage to the lower section, and the two sections having abutting ends with peripheral flanges, the flange of the upper section overlapping the flange of the lower section and having apertures angularly spaced relative to the axis of the standard-like member, said safety coupling comprising:

a plurality of frangible apertured clips angularly spaced around the standard-like member, each clip engaging the undersurface of both flanges, each of said clips having a weakening zone so as to be frangible upon upward and/or sidewise movement of said upper section in the area of the particular clip;

and bolt means for retaining the upper section on the lowe section, said bolt means including a bolt extending through the angularly spaced apart apertures in the upper flange and aligned apertures in said clips and nuts on said bolts bearing against said clips, each said bolt having a circumferential weakening groove positioned in a plane between the clips and the undersurfaces of the flanges.

2. A safety coupling as claimed in claim 1 in which said weakening zone in each frangible clip includes a first weakening groove extending in a radial direction with respect to the standard-like member and a second groove extending in a direction transverse to said first groove and having an axis lying in the same plane as an axis of said first groove.

3. A safety coupling as claimed in claim 2 in which axes of said grooves intersect an axis of the aperture through said clip.

4. A safety coupling as claimed in claim 2 in which said grooves are located in a side of said clip furthest from the side engaging the undersurfaces of said flanges.

5. A safety coupling as claimed in claim 1 in which the peripheral flange of the upper section is provided with a downwardly extending skirt outwardly of said clips, said skirt having an interior tapered surface for eliminating the catching of the skirt on the end of the lower section.

6. A safety coupling as claimed in claim 1 in which each of said bolts having a head bearing on the upper surface of the flange of said upper section, and in which each clip is provided with a recess on its surface furtherest away from the flanges, said recess being complementary in shape to each of said nuts received on the end of the bolts.

7. A safety coupling as claimed in claim 1 in which the peripheral flange of the upper section is substantially rectangular shaped in plan elevation and in which said clips are positioned at each corner area of the flange of said upper section.

8. A safety coupling as claimed in claim 1 in which each of said frangible clips is triangular shaped in plan elevation, and in which said weakening zone includes a first weakening groove extending in a radial direction with respect to the standard-like member from one triangle edge of and in one side of the clip to the aperture through the clip and a second groove comprising two groove sections respectively extending from the other two triangular edges and in said one side to the aperture in the clip, said first and second grooves having axes intersecting the axis of the aperture through said clip.

9. A safety coupling as claimed in claim 8 in which said first and second grooves are located in a side of said clip furthest from the side engaging the undersurfaces of said flanges and wherein spaced pads are provided on the side on the clip bearing against the undersurface of one of said flanges, said pads being spaced outwardly of a plane extending through the first weakening groove whereby the bearing load on the clip is evenly distributed away from the first groove.

10. A fire hydrant comprising:
a lower hydrant barrel section having a peripheral flange at its upper end;
an upper hydrant barrel section having a peripheral flange at its lower end for abutting with the flange of the lower barrel section, said flange of said upper barrel section overlapping said flange of said lower barrel section and having angularly spaced apart apertures therein, said upper barrel section having at least one radially extending nozzle;
sealing means between the flanges of said upper and lower barrel sections;
and a safety coupling for connecting said upper barrel section to said lower barrel section, said safety coupling including a plurality of frangible apertured clips angularly spaced apart around the upper and lower barrel sections, each clip engaging the undersurfaces of both flanges, and each of said clips having a weakening zone on its downwardly facing surface so as to be frangible upon upward and/or sidewise movement of said upper barrel section in the area of the particular clip, and bolt means for retaining the upper barrel section on the lower barrel section, said bolt means including bolts extending through the angularly spaced apart apertures in the upper flange and aligned apertures in said clips and nuts bearing against the downwardly facing surface of said clips, each bolt having a weakening groove positioned in a plane substantially between the clips and the undersurfaces of the flanges.

11. A fire hydrant as claimed in claim 10 in which said weakening zone in each frangible clip includes a first weakening groove extending in a radial direction with respect to the axis of the barrel sections and a second groove extending in a direction transverse to the first groove.

12. A fire hydrant as claimed in claim 11 in which the peripheral flange of the upper barrel section is provided with a downwardly extending skirt outwardly of said clips, said skirt having an interior tapered surface for eliminating the catching of the skirt on the flange of the lower barrel section.

13. A fire hydrant as claimed in claim 11 in which the peripheral flange of the upper barrel section is substantially rectangular shaped in plan elevation and in which said clips are positioned at each corner area of the flange of the upper barrel section.

14. A fire hydrant as claimed in claim 13 in which said flange of said lower barrel section is circular whereby said upper barrel section may be assembled on said lower barrel section with its nozzle pointing in a predetermined direction.

15. A fire hydrant as claimed in claim 14 wherein said sealing means includes a circular groove in the lower surface of the flange of the upper barrel section, said groove being rectangular in cross-section and a ring gasket in said groove, said ring gasket being rectangular in cross-section and complementary in shape to said groove and having an interior diameter prior to installation slightly less than the diameter of said groove whereby said gasket must be extended slightly to be inserted into said groove and is held in place when the upper barrel section is installed.

16. A fire hydrant as claimed in claim 15 including upper and lower valve stem sections within said upper and lower barrel sections, and frangible coupling means between said valve stem sections.

17. A fire hydrant as claimed in claim 10 in which each of said frangible clips is triangular shaped in plan elevation, and in which each of said clips weakening zone includes a weakening groove extending in a radial direction with respect to the barrel sections from one edge of the clip to the aperture through the clip and a second groove comprising two grooved sections respectively, the two grooved sections extending from the other two edges of the clip to the aperture in the clip, said first and second grooves have axes intersecting the axis of the aperture through said clip.

18. A fire hydrant as claimed in claim 17 wherein spaced pads are provided on each said clip for bearing against the undersurface of the flange of said lower barrel section, said pads being spaced outwardly of a plane extending through said first weakening groove whereby the bearing load on the clip is evenly distributed and away from the first groove.

* * * * *